J. A. TOPPING.
LIGHTING AND SIGNALING SYSTEM FOR VEHICLES.
APPLICATION FILED JAN. 10, 1916.
1,228,263.
Patented May 29, 1917.
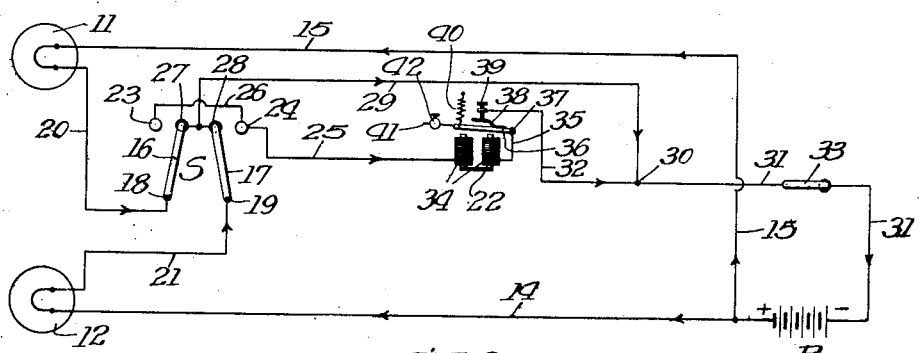
Fig. 1.
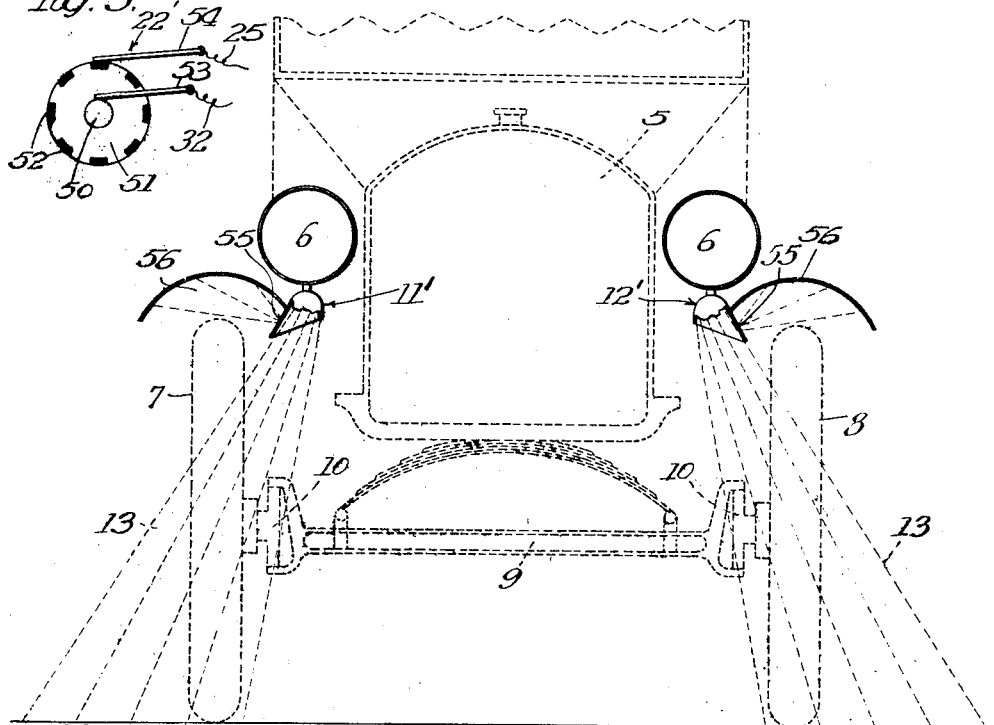
Fig. 2.
Fig. 3.
Witnesses:
Robert F. Weir
Arthur W. Carlson
Inventor
John A. Topping
by Force Bain
Attys ns.
UNITED STATES PATENT OFFICE.

JOHN A. TOPPING, OF CHICAGO, ILLINOIS.

LIGHTING AND SIGNALING SYSTEM FOR VEHICLES.

1,228,263.  Specification of Letters Patent.  Patented May 29, 1917.

Application filed January 10, 1916. Serial No. 71,241.

*To all whom it may concern:*

Be it known that I, JOHN A. TOPPING, a citizen of the United States, residing at Chicago, in the county of Cook and State of Illinois, have invented certain new and useful Improvements in Lighting and Signaling Systems for Vehicles, of which the following is a specification.

My invention relates to composite lighting and signaling systems and more especially for automobiles and other similar self-propelled vehicles.

One of the objects of my invention is to provide a combined lighting and signaling system in which the lamps thereof may be used to illuminate a field adjacent the vehicle for the guidance of the driver of the signaling vehicle, and in which a characteristic significance may be given to either or both of the lamps included in the system, by the driver of said vehicle, as means for transmitting to an approaching vehicle driver an indication of intention of the signaling driver as to his intention to change of direction of movement of the signaling vehicle; change of speed, or to stop.

Another object of my invention is to provide a system, of the character described, in which the signaling influence may become clearly visible from distant points of observation located in the front, side or rear of said vehicle, without producing a glare in the eyes of the observer.

Other and further objects of my invention will become readily apparent to persons skilled in the art, from a consideration of the following description when taken in conjunction with the drawings, wherein:—

Figure 1 is a diagrammatic view of the electric circuits included in my signaling system showing one means of interrupting or rapidly changing the value of the current and flashing the lamps.

Fig. 2 shows the front end of an automobile and the head light lamps to which the signal lamps are shown to be attached.

Fig. 3 is a detail of a modified means for interrupting or rapidly opening and closing the electric circuit.

Throughout the views the same reference characters are employed to indicate similar parts.

In the drawings, 5 shows, in dotted lines, the front end of a conventional type automobile, and 6—6 the ordinary head lights of such a vehicle, 7 and 8 show the respective front wheels of the vehicle connected with the axle 9. In changing direction of movement of the vehicle it is only necessary to swivel the wheels 7 and 8 on their respective vertical axes 10, as usual in structures of this character by manually movable means usually provided for this purpose.

My signal lamps 11 and 12, forming a part of my invention are placed, one on each side of the longitudinal axis of the vehicle and are located at any suitable place on the automobile structure. In the specific showing they are connected to the bottom of the head-light projectors 6—6 but they may as well be supported by some other part of the vehicle. The rays of light, 13, which emanate from the lamps 11 and 12 are projected downwardly and preferably so as to illuminate the front wheels 7 and 8 and a limited field of the road over which or near which they pass. The hoods of the lamps 11 and 12 are so fashioned that the reflectors, within the lamps, cannot be seen from horizontal planes from the rear, front or sides of the lamp, and therefore the lamps do not produce a disagreeable glare in the eyes of the observer. The fields illuminated by these lamps, can be seen by the driver of the signaling vehicle and constitute, in part, the roadway over which the vehicle is passing, and the front wheels of the vehicle, thus enabling the driver to select his path over poorly constructed and narrow roads.

Normally the signal lamps 11 and 12, glow with a steady light thus illuminating the adjacent portions of the roadway and the front wheels of the vehicle so that the latter may be seen by approaching vehicles from the rear or front.

Should the driver of the vehicle provided with my signal system desire to notify drivers of vehicles approaching from the rear or from the front or both, that he is about to turn the corner, to the right or to the left, as the case may be, he causes the circuit including the lamp, on the particular side of the vehicle nearest the corner in the direction in which he desires to turn his vehicle, to be rapidly opened and closed thereby causing the light rays emanating from said lamp to be correspondingly vibrated or the lamp to be rapidly flashed.

The circuit containing the signaling lamps includes a battery B, or other source of electric current, such as a magneto or dynamo, capable of affording sufficient current for illuminating the signal lamps.

The positive terminal of the battery is connected to the lamp 12, by means of wire 14, and the lamp 11 by wire 15. The switch S consists of a blade 16 and a blade 17, pivoted as at 18 and 19, respectively. The lamp 11 is connected to the switch blade 16, by wire 20, and the lamp 12 is connected to the switch blade 17, by wire 21. An electric circuit interrupting device 22 is connected to the outer contacts, 23 and 24, by the wires 25 and 26. Contacts 27 and 28, of the switch, are connected together and are connected by wire 29 to the point 30, thus bridging the vibrating device 22. Wire 31 connects the negative side of the battery B with the point 30 and the vibrating device is connected to the point 30 by the wire 32. A switch 33 may be located anywhere in the wire 31, for opening the circuit so as to extinguish both of the lamps 11 and 12.

The operation of the device is as follows:—

As shown in Fig. 1, the lamps 11 and 12 will burn steadily, they are in parallel circuit and the interrupting branch of the circuit is open. The circuit through the lamps is completed from the positive side of the battery B over the wire 14, to the lamp 12, and from thence by the wire 21 to the point 19, and over the switch blade 17, to contact 28, and from thence by wire 29, to the negative side of the battery, thus causing the lamp 12 to glow steadily. The circuit to lamp 11 is through the wire 15, from thence over wire 20 to the point 18, over the switch blade 16, to the contact point 27, and thence back over the wire 29 to the negative terminal of a battery, causing the lamp 11 to glow steadily. At this time the circuit which includes the vibrator 22 is broken. Now if it is desired to interrupt the current passing through the lamp 11 to flash the lamp, for instance, blade 16 may be pushed over to make connection with the contact 23, when the circuit will be over the wire 15 through the lamp 11, to point 18 through the switch-blade 16, over the blade 16 to the contact 23, and over the wires 25 and 26 through the circuit maker-and-breaker or vibrator 22, and through the wires 32, 31 back to the negative side of the battery. The vibrator 22 consists of a pair of electro-magnets 34, the terminal 35 being connected to the insulated armature 36, as at 37. A resilient tongue 38, is carried by the armature, and is adapted to make electric connection with a contact 39; the armature being held in retracted position by a spring 40. The contact 39 is connected to the wire 32. When the current passes through the magnet coils 34, they magnetize their cores which attract the armature 36 against the opposed yielding spring 40, breaking the circuit between the tongue 38 and the contact 39, thus demagnetizing the magnets and opening the circuit including the lamp 11. The spring 40, however, now returns the armature to retracted position when the magnet 34 becomes demagnetized and contact is again established between points 38 and 39 again magnetizing the coils and causing the action to be repeated. This action will continue so long as the switch blade 16 is in connection with the contact 23 and the circuit is completed through the vibrator 22.

The armature 36 is provided with an extending stem 41 on which is an adjustable weight 42. The weight may be moved along the stem for the purpose of varying the rapidity of the making and breaking of the circuit by the armature. The farther removed from the pivotal point 37 the slower will be the make and break of the circuit and the closer the weight is brought toward that point, the faster will be the make and break of the circuit so that the rapidity with which the lamp will wink, or may thus be flashed, may be regulated in this manner.

Now if it is desired to cause the lamp 12 to flash it is only necessary to move the blade 17 into electrical connection with the contact 24, then both of the lamps will be flashed in unison. The current for the lamp 12 passes over the wire 14 through the lamp and over the wire 21, the switch blade 17, back to the point 24, thus placing this side of the circuit in parallel with the circuit including the lamp 11. The vibrator 22, interrupting the current, in this instance, for both lamps. Now, if it is desired that either of the lamps 11 or 12, shall glow steadily, instead of being flashed, it is only necessary to remove the respective switch blades 16 or 17, into connection with the contact 23 or 24, as the case may be. If the switch blade 16 be moved back to the contact 23 lamp 11 will glow steadily and lamp 12 will continue to be flashed in the manner described.

An electrical vibrator is not essential to the operation of my device, as the current may be opened and closed rapidly by mechanical means, such as shown in Fig. 3 in which 22′ is a mechanical vibrator which consists of a shaft 50, carrying a metal disk 51, provided with insulating segments 52, at intervals. The brush 53 is connected to the wire 32 and the brush 54 is connected to the wire 25, substantially as shown in Fig. 1, wherein the mechanical vibrator will take the place of the electrical vibrator 22. The rotatable disk 51 may be secured to the shaft carrying the cooling fan, or the shaft of the magneto or to any other rotating part of the engine, or it may be a separate shaft designed and intended for this specific purpose only.

The hoods 11' and 12' of the lamps 11 and 12, respectively, may each be provided with an illuminating opening 55, whereby a portion of the light may be projected under the fenders 56—56 of the vehicle so as to illuminate the under side of the fenders and render the effect of lighting more clearly visible from a longer distance without producing any glare in the eyes of the observer.

When the vehicle is being used in a city, as when the head lights are not employed, the signal lamps 11 and 12 are of considerable value to the driver of the vehicle. They illuminate the immediate neighborhood of the roadway so that the driver may be able to judge the condition of the road frequently made obscure by shadow of the vehicle and at the same time the lamps serve as means for illuminating the front wheels of the vehicle so that a following vehicle, or one approaching from in front, may, by observing the wheels more easily locate the approaching or receding vehicle. When the driver, carrying the signal lights, desires to turn to the right, assuming that the lamp 11 is on the right side of the vehicle, he moves the switch 16 into electrical connection with the contact 23 thereby causing the lamp 11 to be rapidly flashed indicating to occupants of other vehicles and to pedestrians that he is about to turn his vehicle to the right. After he has made the turn, he may move the switch blade 16 back into connection with the contact 27, causing the lamp 11 to glow steadily, as before. Now if he is about to turn to the left he moves the blade 17 into connection with the contact 24 causing the lamp 12, on the left hand side to be rapidly flashed, thereby indicating to occupants of neighboring automobiles and to pedestrians on the roadway, that his vehicle is about to turn to the left. If he is driving along a straight-away course and desires to stop, he then flashes both lamps, by moving the blades 16 and 17 into connection with the contacts 33 and 34, respectively, causing both lamps to flash, thus indicating to observers that he is about to stop or slow down his vehicle.

My signal lights are especially useful in connection with fire engines, or hospital ambulances, which are usually driven at a recklessly high speed, as by this means the occupants of the roadway, and of other vehicles, may be informed in advance of the near approach of the vehicle, the direction in which it is intended to turn, so as to give plenty of time to get out of the way and making it unnecessary for other persons or vehicles, on the opposite side of the street to that in which the approaching vehicle is about to turn to be disturbed.

Some of the other advantages of my signal system are that it may be seen from a long distance from any point of view. That it does not produce a glare and blind the eyes of the observer. That it is advantageously useful to the driver of the vehicle bearing the lights when and while they are used for signaling purposes. That they are a good substitute for the head-lights for vehicles where such lights are used only to indicate the presence of the vehicle carrying them, and not for the purpose of illuminating the roadway ahead, as in cities. It is especially useful to illuminate that portion of the roadway which is usually dark, that is to say that portion thereof that is immediately in front of the steering wheels and by the sides of such wheels, and it enables passing vehicles to pass on narrow roadways without danger of collision.

Whereas I have illustrated and described a preferred embodiment of my invention with a possible modification thereof, it will be obvious to those skilled in the art that various changes may be made therein without departing from the spirit and scope of the appended claims.

Having described my invention, what I claim is:

1. A signaling system for association with a vehicle having a pair of wheels, one on each side thereof, and comprising a lamp mounted adjacent each wheel and positioned to throw its rays downwardly and outwardly beyond the wheel in a transverse path upon the roadway, means under the control of the vehicle operator for energizing one or both of said lamps periodically to cast upon the roadway a series of flashes visible from the front or rear of the vehicle and thereby signal the direction in which the vehicle is to turn or that it is to stop, and means under the control of the vehicle operator to energize either one or both of said lamps continuously to give an uninterrupted steady illumination of the roadway adjacent and at the outer side of the wheels.

2. A signaling system for association with a vehicle having a pair of wheels, one on each side thereof, and comprising a lamp mounted adjacent each wheel and positioned to throw its rays downwardly and outwardly beyond the wheel in a transverse path upon the roadway, and means under the control of the vehicle operator for energizing either one or both of said lamps periodically to cast upon the roadway a series of flashes visible from the front or rear of the vehicle and thereby signal the direction in which the vehicle is to turn or that it is to stop.

In testimony whereof I hereunto set my hand in the presence of two subscribing witnesses.

JOHN A. TOPPING.

In the presence of—
 FORÉE BAIN,
 MARY F. ALLEN.